United States Patent [19]

Bennett, Jr. et al.

[11] Patent Number: 5,251,229
[45] Date of Patent: Oct. 5, 1993

[54] LASER WITH REDUCED INTENSITY FLUCTUATIONS

[75] Inventors: William R. Bennett, Jr., New Haven, Conn.; Veniamin P. Chebotayev, Novosibirsk, U.S.S.R.

[73] Assignee: Yale University, New Haven, Conn.

[21] Appl. No.: 779,721

[22] Filed: Oct. 18, 1991

[51] Int. Cl.$^5$ .......................... H01S 3/08; H01S 3/10
[52] U.S. Cl. ....................... 372/92; 372/97; 372/96; 372/99; 372/98; 372/21
[58] Field of Search ............... 372/21, 31, 29, 55, 372/60, 96, 97, 98, 99, 92; 385/122; 359/326, 327, 328, 329, 330

[56] References Cited

U.S. PATENT DOCUMENTS

| | | | |
|---|---|---|---|
| 3,395,367 | 7/1968 | Bell et al. | 372/31 |
| 3,486,131 | 12/1969 | Smith | 372/97 |
| 3,522,553 | 8/1970 | Fox | 372/18 |
| 3,581,228 | 5/1971 | Smith | 372/18 |
| 3,648,193 | 3/1972 | Foster et al. | 372/18 |
| 3,774,120 | 11/1973 | Ross | 372/31 |
| 3,858,056 | 12/1974 | Melamed et al. | 372/31 |
| 3,998,557 | 12/1976 | Javan | 372/97 |
| 5,173,916 | 12/1992 | Benda | 372/92 |
| 5,173,918 | 12/1992 | Townsend et al. | 372/95 |

OTHER PUBLICATIONS

See et al., "Coupled Optical Resonators . . . " Applied Optics vol. 20 No. 7 Apr. 1981 pp. 1211–1217.
E. Giacobino et al., "Squeezed Light: Progress and Perspectives", Laser Spectroscopy IX, Jun. 1989, pp. 180–183.
V. N. Lisitsyn et al., "Absorption Saturation Effects in a Gas laser", Soviet Physics JET, P, vol. 27, No. 2, Aug., 1968, pp. 227–229.
V. N. Lisitsyn et al., "Hysteresis and 'Hard' Excitation in a Gas laser", JETP Letters, vol. 7, No. 2, Jan. 15, 1968, pp. 1–3.
A. P. Kazantsez et al., "The Quantum Theory of the Laser", Progress in Quantum Electronics, vol. 3, 1975, pp. 233–289.
S. L. McCall, "Instabilities in Continuous-Wave Light Propagation in Absorbing Media", Physical Review A, vol. 9, No. 4, Apr. 1974, pp. 1515–1523.
B. R. Mollow, "Propagation of Intense Coherent Light Waves in Resonant Media", Physical Review A, vol. 7, No. 4, Apr. 1973, pp. 1319–1322.
H. M. Gibbs et al., "Differential Gain and Bistability Using a Sodium-Filled Fabry-Perot Interferometer", Physical Review Letters, vol. 36, No. 19, May 10, 1976, pp. 1135–1138.
S. Reynaud et al., "Photon Noise Reduction by Passive Optical Bistable Systems", The American Physical Society, Mar. 1989, pp. 1440–1446.
W. R. Bennett Jr., "The Physics of Gas Lasers", Gordon and Breach Science Publishers, Inc., 1977, pp. 62–201.
V. S. Letokhov et al., "Optical Frequency Standard with Nonlinearly Absorbing Gas Cell", JETP Letters, vol. 9, Jan. 1969, pp. 215–217.
R. L. Barger et al., "Pressure Shift and Broadening of Methane Line at 3.39$\mu$ Studied by Laser-Saturated Molecular Absorption", Physical Review Letters, vol. 22, No. 1, Jan. 6, 1969, pp. 4–8.
W. R. Bennett Jr., "Hole Burning Effects in Gas lasers With Saturable Absorbers", Comments on Atomic and Molecular Physics, vol. 2, 1970, pp. 10–18.

(List continued on next page.)

Primary Examiner—Brian Healy
Attorney, Agent, or Firm—Fish & Richardson

[57] ABSTRACT

An intensity stabilized laser including a gain cavity containing a gain medium; and an absorbing cavity containing a nonlinear absorbing medium, wherein the absorbing cavity is located with respect to the gain cavity and the characteristics of the nonlinear absorbing medium are selected so as to provide negative feedback from the absorbing cavity to the gain cavity during operation of the laser to thereby control the gain of the gain cavity.

25 Claims, 4 Drawing Sheets

OTHER PUBLICATIONS

S. N. Bagaev et al., "Frequency Stability and Reproducibility of the 3.39 μm He-Ne Laser Stabilized on the Methane Line", Applied Physcis, vol. 7, 1975, pp. 71-76.

S. N. Bagaev et al., "Laser Frquency Standards", Sov, Phys. Usp., vol. 29, No. 1, Jan. 1986, pp. 82-103.

V. P. Chebotayev et al., "Argon Ion Laser With High Frequency Stability", Metrologia, vol. 27, 1990, pp. 61-64.

J. M. Chartier et al., "International Comparison of Iodine-Stabilized Helium-neon Lasers at λ=633 nm Involving Seven Laboratories", Metrologia, vol. 28, 1991, pp. 19-25.

D. A. Kleinman et al., "Discrimination Against Unwanted Orders in the Fabry-Perot Resonator", BSTJ, vol. 41, 1962, pp. 453-462.

N. Kumagai et al., "Design Considerations for Mode Selective Fabry-Perot Laser Resonator", IEEE Journal Of Quantum Electronics, vol. QE-1, No. 2, May 1965, pp. 85-94.

V. I. Perel et al., "Theory of Lasers With an Ancillary Mirror", Optics and Spectroscopy, vol. 25, 1968, pp. 401-404.

M. B. Spencer et al., "Theory of Two Coupled Lasers", Physical Review A, vol. 5, No. 2, Feb. 1972, pp. 893-898.

LASER WITH REDUCED INTENSITY FLUCTUATIONS

BACKGROUND OF THE INVENTION

The invention relates to a general means for reducing intensity fluctuations in lasers.

One of the current, most-challenging problems in physics is the experimental detection of gravitational waves. First predicted by Einstein in his famous 1916 paper on General Relativity, all attempts to the present date to verify the existence of such waves have been inconclusive. Although initial studies involving coincidences between widely-spaced rf gravitational-radiation detectors have not been fruitful, the development of lasers with unusual frequency stability and refined techniques for phase-locking lasers to cavities has led to renewed interest in gravity wave detection by large scale laser-interferometric means. If such experiments are to be successful, extreme low-noise intensity stability will be required of the laser source.

The development of low-noise lasers is also of considerable general experimental, theoretical and commercial interest. The reduction of noise levels is of obvious importance to most experiments in metrology and spectroscopy and not just to the study of gravity wave detectors. In addition, in fiber-optic communications systems noise reduction.

Recently, special attention has been given to the production of light sources with noise levels lower than the quantum limit using methods based upon the production of "squeezed" light states arising in the nonlinear interaction of radiation with matter (E. Giacobino, T. Debuisschert, A. Heidemann, J. Mertz and S. Reynaud, in the Proceedings of NICLOS—Bretton Woods, N.H., Jun. 19-23, 1989 (Academic Press, New York, 1989); p. 180.) and a decrease in noise level below the quantum limit has been reported. (H. J. Kimble, in *Atomic Physics II*, ed. by S. Haroche, J. C. Gay and G. Gimbera (World Scientific press, 1989); p. 467.)

Also, it is well-known that saturated absorption inside a single laser cavity produces a bistable regime and hysteresis phenomena. (See, for example, V. N. Lisitsyn and V. P. Chebotayev, "Absorption Saturation Effects in a Gas Laser", Zh. Eksp. i. Teor. Fiz. 54, 419 (1968). [Trans. in Sov. Phys. JETP 27, 227 (1968)]; "Hysteresis and 'Hard' Excitation in a Gas Laser", JETP Letters 7, 3 (1968).) Positive feedback between the optical field and absorption is evident. Increasing the field leads to a reduction in saturable absorption. Conversely, decreasing the effective losses in the cavity increases the intensity inside the laser resonator. Hence, hysteresis phenomena appear when the change in saturated absorption exceeds the change in saturated gain.

Theoretical analysis has shown that a large increase in quantum fluctuations can occur in a laser with intracavity saturable absorption. (A. P. Kazantsev and G. I. Suredutovich, "*The Quantum Theory of the Laser*", in *Progress in Quantum Electronics*, ed. by J. H. Sanders and S. Stenholm (Pergamon Press, Oxford, 1975).) It has also been noted that propagation of a strong beam through a nonlinear absorbing medium can exhibit regions of instability in which fluctuations are amplified. (S. L. McCall, "Instabilities in Continuous Wave Light Propagation in Absorbing Media", Phys. Rev. A9, 1515 (1974); also see, B. R. Mollow, "Propagation of Intense Coherent Light Waves in Resonant Media", Phys. Rev. A7, 1319 (1973).)

Further, when the laser beam is transmitted through a Fabry-Perot interferometer filled with absorber, bistability and differential amplification of noise fluctuations can occur. (H. M. Gibbs, S. L. McCall, and T. N. C. Venkatesan, "Differential Gain and Bistability using a Sodium-Filled Fabry-Perot Interferometer", Phys. Rev. Letters 36, 1135 (1976). However, when the incident and output beam from such an absorber-filled cavity are combined interferometrically and the system is operated near the turning points in the bistable region, photon noise can be reduced below the shot noise at nonzero frequency. (S. Reynaud, C. Fabre, E. Giacobino, and A. Heidmann, "Photon Noise Reduction by Passive Optical Bistable Systems", Phys. Rev. A40, 1440 (1989).) This photon noise reduction is associated with a temporal redistribution of the photons inside the cavity. Unfortunately, the optimum squeezing condition in the passive case occurs right at the turning points where the system is on the edge of instability.

SUMMARY OF THE INVENTION

The invention decreases the above-mentioned amplitude fluctuations by using negative feedback between the field and the absorber inside the cavity.

In one aspect the invention features an intensity stabilized laser including a gain cavity containing a gain medium; and an absorbing cavity containing a nonlinear absorbing medium. The absorbing cavity is located with respect to the gain cavity and the characteristics of the nonlinear absorbing medium therein are selected so as to provide negative feedback from the absorbing cavity to the gain cavity during operation of the laser to thereby control the gain of the gain cavity.

Preferred embodiments include the following features. The gain cavity and the absorbing cavity each have resonances which substantially coincide so as to produce a strong interaction between the gain cavity and the absorbing cavity during operation of the laser. The nonlinear absorbing medium is a saturable absorbing medium. The loss for the laser can be characterized by an effective loss ($L_{ef}$) that is a function of a field intensity I in the gain cavity and the effective loss is characterized by a region in which the first and second derivatives of the field intensity with respect to the effective loss are zero at a point on the $L_{ef}(I)$ curve. The operating point of the laser is selected to be in the vicinity of the point at which the first and second derivatives of the field intensity with respect to the effective loss are zero. The gain cavity is formed by an input mirror and an output mirror and the absorbing cavity is formed by an input mirror and an output mirror. Both the output mirror of the gain cavity and the input mirror of the absorbing cavity are implemented by a single high-reflectance mirror. The transmission coefficient of the high-reflectance mirror is much less than one, e.g. in the range of about $10^{-4}$ to $10^{-3}$.

Preferred embodiments are also selected from the following gain/absorber combinations: a gain medium of helium-neon gas and an absorbing medium of methane ($CH_4$), both operating at about 3.39 μm.; a gain medium of helium-neon gas and an the absorbing medium of molecular iodine, both operating at about 0.633 μm.; a gain medium of helium, carbon dioxide and nitrogen ($He-N_2-CO_2$) and an absorbing medium of $SF_6$, both operating at about 10.6 μm.; a gain medium of argon ions and an absorbing medium made of an iodine molecular absorber, both operating at about 0.5145 μm.; a gain medium of krypton ions and an absorbing medium of iodine saturable absorbers. In another preferred embodiment, the gain cavity and the gain medium forms a exciplex laser and the absorbing medium is made of molecular saturable absorbers. In yet another preferred embodiment, the gain cavity and the gain medium forms a solid state laser and the absorbing medium is made of a crystal with color centers acting as saturable absorbers.

In another aspect, the invention features an intensity stabilized laser including an input mirror; an output mirror which together with the input mirror forms a first cavity; an intermediate mirror located between the input and output mirrors to define a gain cavity and an absorbing cavity both within the first cavity, the gain cavity bounded on one end by the input mirror and on its opposite end by the intermediate mirror and the absorbing cavity bounded on one end by the intermediate mirror and on its opposite end by the output mirror; a gain medium located in the gain cavity; and a nonlinear absorbing medium located in the absorbing cavity.

The invention should be of great importance in any application of lasers where stability is important, including, for example, metrology, laser spectroscopy, communications and laser surgery. Moreover, the invention should work with almost any of the commonly known CW lasers and is especially applicable to frequency stabilized lasers locked to absorption lines.

Other advantages and features will become apparent from the following description of the preferred embodiment and from the claims.

DESCRIPTION OF THE PREFERRED EMBODIMENT

FIG. 1b is the "effective" laser mirror represented by the absorber cavity shown in FIG. 1a;

STRUCTURE AND OPERATION

It can be shown through a theoretical analysis, that a substantial decrease in the amplitude noise from a laser can be achieved through use of a coupled system including a nonlinear saturable absorber. The coupled system may be constructed as a three-mirror laser in which there are two cavities, one cavity containing an amplifier and the other cavity containing the absorber. Because of strong nonlinear effects, there are two substantially different regions of operation in such a system. One region is characterized by hysteresis effects and instability. The other region is characterized by stability and operation resembling that of a conventional laser. As will be outlined below, a new regime of operation exists in which interaction with the saturable absorber can be used to provide negative feedback between the field and the absorber to reduce noise fluctuations inside a laser cavity. In that regime, the laser output appears to depend very little on changes in gain or loss in the system. Because these interactions proceed at the velocity of light, the bandwidth for this noise reduction method is unusually large.

Figure 1A:
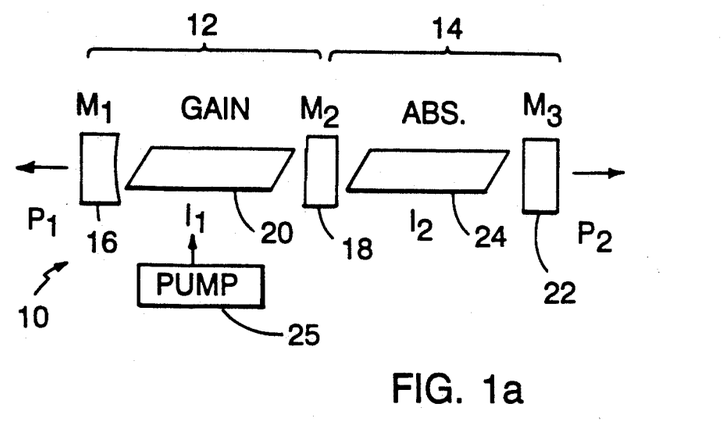
FIG. 1a is a schematic representation of a three-mirror laser system.

Referring to FIG. 1a, a three-mirror laser system 10 which embodies the invention includes an gain cavity 12 and an absorbing cavity 14 (also referred to as resonators 12 and 14). Gain cavity 12, which is formed by an input mirror 16 and a high-reflectance mirror 18, contains an amplifying medium 20. Absorbing cavity 14, which is formed by reflecting mirror 18 and an output mirror 22, contains a saturable absorbing medium 24. For added clarity, mirrors 16, 18 and 22 are also labelled $M_1$, $M_2$, and $M_3$, respectively.

Laser system 10 also includes a pump source 25 which may be any one of a variety of different laser pump sources known to those skilled in the art. It, of course, is selected to be appropriate for the particular gain medium used in gain cavity 12.

Amplifying and absorbing media 20 and 24 are separated by high-reflectance mirror $M_2$ which divides system 10 into two coupled resonators. If the resonant frequencies of cavities 12 and 14 are different, the interaction between them is small. In that limit, oscillation in system 10 may be considered as that in a conventional laser with a cavity formed by mirrors $M_1$ and $M_2$. However, when the frequencies of cavities 12 and 14 more closely coincide, stronger interaction occurs. Then, saturation of absorber medium 24 by a strong field leads to an increase in output intensity through output mirror $M_3$. In this case, a strong negative feedback mechanism between the field intensity $I_1$ in gain cavity 12 and the absorption in absorbing cavity 14 is present and works as follows. Increasing the gain and intensity in gain cavity 12 leads to increased field intensity $I_2$ in absorbing cavity 14 and, correspondingly, to a decrease in absorption (which varies inversely with intensity). That, in turn, leads to increased transmission from cavity 12 to cavity 14 through mirror $M_2$. This results in an increase in the loss of laser system 10 and a decrease of the laser intensity $I_1$ in cavity 12.

In laser system 10, the intensity $I_1$ in cavity 12 (hence, the power output $P_1$ shown to the left in the FIG. 1a) is stabilized, whereas the intensity $I_2$ in cavity 14 (hence, the power output $P_2$ shown to the right in FIG. 1a) is strongly variable.

For simplicity, consider the case where all the mirrors $M_1$, $M_2$, and $M_3$ have the same transmission coefficient, T. Here, the total loss for system 10 involves the transmission of mirror $M_1$ and of mirror $M_3$, the internal dissipative losses, and the absorption in cavity 14. Due to the difference between the field intensities in cavities 12 and 14, the laser power $P_1$ emitted to the left from cavity 12 and $P_2$ emitted to the right from cavity 14 are given by:

$$P_1 = I_1 T \text{ and } P_2 = I_2 T \quad (1)$$

where $I_1$ and $I_2$ are the field intensities in the first and second cavities.

Figure 1B:
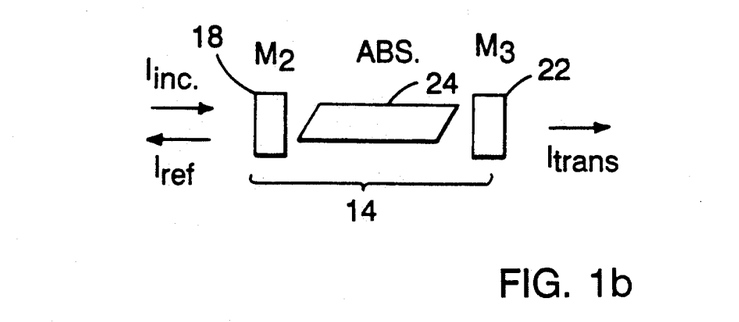

To determine the laser oscillation conditions, it is convenient to consider cavity 14 as a mirror with an effective transmission coefficient, $T_{ef}$, and an effective reflection coefficient, $R_{ef}$ and then use these coefficients to determine the laser oscillation threshold. (See FIG. 1b.) The coefficients $T_{ef}$ and $R_{ef}$ can be expressed in terms of the incident light intensity $I_{inc}$ arriving at absorbing cavity 14 from gain cavity 12, the reflected light intensity $I_{ref}$ reflected back into gain cavity 12 and the transmitted light intensity $I_{trans}$ which represents the output of laser system 10. Expressed in terms of these light intensities, the effective transmission, $T_{ef} = I_{trans}/I_{inc}$, and effective reflectance, $R_{ef} = I_{ref}/I_{inc}$.

By summing the infinite series for the transmitted and reflected field amplitudes by the second (Fabry-Perot) cavity 14 at resonance, it can be shown that:

$$T_{ef} = T^2/(T+f+A_s)^2 \text{ and } R_{ef} = (f+A_s)^2/(T+f+A_s)^2. \quad (2)$$

where the total fractional energy loss per pass in cavity 14 during oscillation is given by $(T+f+A_s)$, $A_s$ is the saturated absorption, f is the dissipative loss per pass from sources such as scattering and it has been assumed that T, f, $A_s \ll 1$. Note that $T_{ef} + R_{ef} \neq 1$ because of the loss in cavity 14.

Clearly, from Eqs. (1) and (2), the power out of the absorption end of the laser is $P_2 = I_2 T = I_1 T_{ef}$. Hence, $$I_2 = I_1 T/(T+f+A_s)^2. \quad (3)$$

In practice, the system requires "hard excitation" in the sense that the gain must be turned up high enough to exceed the threshold condition, $$2G > 1 - R_{ef} + T + 2f = 1 - (f+A)^2/(T+f+A)^2 + T + 2f, \quad (4)$$

involving the unsaturated gain and loss for oscillation to occur. However, after oscillation starts, G and A decrease to their saturated values and the condition for CW (i.e., continuous wave) laser oscillation becomes:

$$2G_s = L_{ef} = 1 - (f+A_s)^2/(T+f+A_s)^2 + T + 2f \quad (5)$$

where $L_{ef}$ is the effective loss in the laser (i.e. gain cavity 12) after oscillation has reached steady-state, $G_s$ is the saturated gain per pass, and the fractional dissipative loss per pass, f, is assumed to be the same in each cavity 12 and 14. Eq. (5) is valid for small gain and states that the round trip saturated gain, $2G_s$, equals the effective loss, $L_{ef}$, at steady state. The latter, of course, includes the saturated absorption, $A_s$, in cavity 14.

If homogeneous saturation is assumed in both media 20 and 24, then $$G_s = G/(1+g_1I_1) \text{ and}$$

$$A_s = A/(1+g_2I_2).$$

where $g_1$ and $g_2$ are saturation parameters with values that depend upon the particular medium being characterized. Eq. (5) then takes the form, $$2G_s = L_{ef},$$

where $$2G_s = 2G/(1+g_1I_1), \quad (6)$$

$$L_{ef} = \{1-(f+A_s)\}^2/\{T+f+A/(1+g_2I_2)\}^2 + T + 2f,$$

and $I_1$ and $I_2$ are related by Eq. (3).

Eqs. (1), (2), and (6) permit determining the output laser intensities $P_1$ and $P_2$. However, the equations are extremely nonlinear and the analytic solution of Eq. (6) is quite complicated. In order to solve Eq. (6), it is easiest to treat $T_{ef}$ as the independent variable and compute: $I_1$ as a function of $T_{ef}$; $I_2$ as a function of $I_1$ and $T_{ef}$; $A_s$ as a function of $I_2$; $R_{ef}$ as a function of $A_s$ and $T_{ef}$; and then find $L_{ef} - 1 - R_{ef} + T = 2f$.

Eliminating $I_1$ in Eq. (6) permits expressing G directly in terms of the intensity $I_2$:

$$G = (1/2)\{1 + g_1I_2(A/(1+g_2I_2) + T + f)^2/T\} \times \quad (7)$$
$$\{1 - (f + A/(1+g_2I_2))^2/(A/(1+g_2I_2) + T + f)^2 + T + 2f\}$$

Graphic solutions to Eq.(6) help to visualize the behavior and the main properties of the proposed three mirror system. As noted, steady-state laser oscillation corresponds to the requirement that $2G_s(I_1) = L_{ef}(I_1)$. Although the saturated gain has a simple, monotonic dependence on $I_1$, the effective loss, $L_{ef}$, has much more complex behavior.

Figure 2:
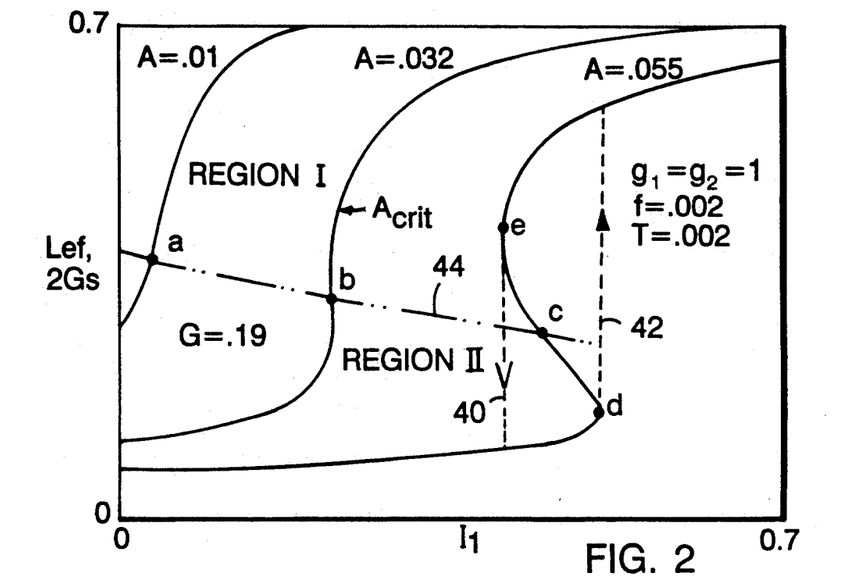
FIG. 2 illustrates the behavior of the effective loss, $L_{ef}$, as a function of $I_1$ for different values of A (solid curves) and a graphical solution for the laser oscillation condition for representative parameters.

As shown in FIG. 2, there are two regions, labelled Region I and Region II, in which the $L_{ef}(I_1)$ curve has distinctly different characteristics. For small values of A (i.e., Region I), the effective loss is monotonic in its dependence on intensity $I_1$, and in that region the system would have noise properties similar to a conventional laser. For large values of the absorption parameter (i.e., Region II), $L_{ef}$ has a triple-valued dependence on the intensity $I_1$. As indicated by the curve for which $A = 0.055$ and by the dashed vertical lines 40 and 42 at the right in FIG. 2, strong hysteresis effects would occur if the intensity $I_1$ were tuned back and forth through the triple-valued region. For example, a vertical upward jump would occur from point d if $I_1$ was increased at that point and a vertical downward jump would occur from point e if $I_1$ were decreased. However, the vertical jump upwards at point d would not occur without a substantial increase in the unsaturated gain. Because $\partial L_{ef}/\partial I_1 < 0$, oscillation between points e and d would be completely unstable.

These two regions are separated by a critical value $A_{crit}$ which can be shown to equal $8(T+f)$. For the curve represented by $A_{crit}$ there is one point, labelled b in FIG. 2, where $\partial I_1/\partial L_{ef} = \partial^2 I_1/\partial L_{ef}^2 = 0$. Typically, point b and the surrounding portions of the $L_{ef}$ curve forms a "plateau" in which $\partial I_1/\partial L_{ef}$ is essentially zero. By adjusting the parameters so that the saturated gain curve ($2G_s$) intersects the effective loss curve ($L_{ef}$) at point b on $A_{crit}$, very stable low-noise oscillation should be obtained.

Figure 3:
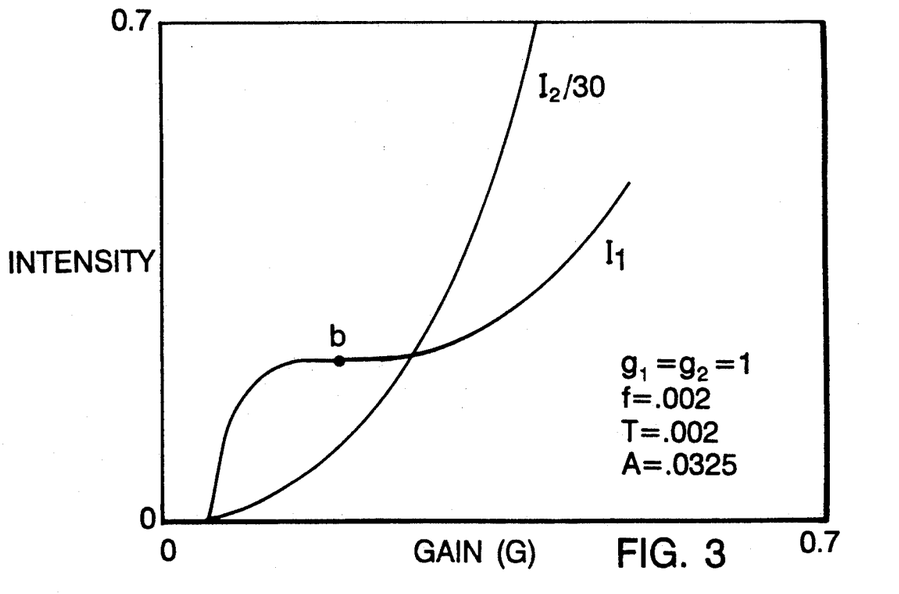
FIG. 3 depicts the intensities $I_1$ and $I_2$ versus gain for the optimum value of the absorption ($A_{crit}$) for the parameters used in FIG. 2.

The actual intensities in cavities 12 and 14 for this condition can be determined from Eq.(7) and are shown as a function of G in FIG. 3 for the same conditions assumed in FIG. 2. The intensity $I_1$ in cavity 12 goes through a point b (corresponding to point b on the $L_{ef}(I_1)$ curve in FIG. 2) where $\partial I_1/\partial G = \partial^2 I_1/\partial G^2 = 0$, whereas intensity $I_2$ in cavity 14 increases strongly with G. Note the plateau in the laser intensity ($I_1$) at point b, corresponding to the optimum operating conditions in FIG. 2. Also note that $I_1$ is independent of the gain over this plateau and the output of the laser (to the left in FIG. 1a) should be nearly independent of fluctuations in the gain.

The desired condition for oscillation corresponds to the saturated gain curve 44 (dashed curve in FIG. 2) intersecting the effective loss $L_{ef}$ at point b on the critical absorption curve and leads to oscillation at point b in the middle of the plateau on the curve for $I_1$ vs G in FIG. 3. Although intensity $I_2$ in absorption cavity 14 will depend strongly on variations in the gain (G), intensity $I_1$ in gain cavity 12 will be nearly independent of fluctuations in the gain at operating point b. Thus, the output ($P_1$) to the left in the apparatus shown in FIG. 1a should be unusually noise-free.

Of course, the particular conditions assumed in FIGS. 2 and 3 are intended only for illustrative purposes. Other choices in the laser parameters might well provide more optimum results without violating the basic concepts of the invention.

It is desirable that the mirror transmission coefficient of mirror $M_2$ be very small, i.e., $T_2 << 1$, implying that the coupling between the two cavities is weak. $T_2$ should also be small compared to the absorption losses of cavity 14. In the case of strong coupling (large $T_2$), there is a splitting of the resonant frequencies of the system into antisymmetric and symmetric modes of the optical electric field which can result in undesired relaxation oscillations. To avoid that effect, weak coupling is used and the absorbing cavity 14 is made shorter in length than the gain cavity 12.

In the described embodiment, $T_2$ for $M_2$ is in the range of about $10^{-3}$ to $10^{-4}$. Note that in the above description, it was assumed that the mirror coefficients for all of the mirrors $M_1$, $M_2$, and $M_3$ were the same, i.e., $T_1 = T_2 = T_3 = T$. This assumption was made for the purpose of simplifying the subsequent explanation. In actual embodiments, it is likely that the coefficients would not be all of the same. In that case, the restriction on $T_2$ (i.e., $T_2 << 1$) should be honored, but the transmission coefficients for the other mirrors $M_1$ and $M_3$ need not comply with this requirement.

In principle, this method could be used to stabilize the power of most known lasers. There are many well-known examples of amplifier-absorber pairs where the frequencies may be closely matched: e.g., He—Ne/$CH_4$ at 3.39 μm, He—$N_2$—$CO_2$/$SF_6$ at 10.6 μm, He—Ne/$I_2$ at 0.633 μm and Ar+/$I_2$ at 0.5145 μm. Other examples include a krypton ion laser with iodine saturable absorbers and exciplex lasers with molecular saturable absorbers. It should also be possible to use solid state or diode lasers matched to crystals with color centers as saturable absorbers. In a number of cases, frequency stabilization of the two cavities could be achieved by locking the cavities to the center of a narrow saturable absorber line using well-known methods of the type discussed in the following references: V. S. Letokhov and V. P. Chebotayev, "Optical Frequency Standard with Nonlinearly Absorbing Cell", ZhETF Pis. 9, 364 (1969) [Trans. in JETP Letters 9, 215 (1969)]; R. L. Barger and J. L. Hall, "Pressure Shift and Broadening of Methane Line at 3.39μ Studied by Laser-Saturated Absorption Molecular Spectroscopy", Phys. Rev. Letters 22, 4 (1969); W. R. Bennett, Jr., "Hole Burning Effects in Gas Lasers with Saturable Absorbers", Comments on Atomic and Molecular Physics 2, 10 (1970); S. N. Bagayev and V. P. Chebotayev, "Frequency Stability and Reproducibility of the 3.39 μm He—Ne Laser Stabilized on the Methane Line", Appl. Phys. 7, 71 (1975); S. N. Bagaevev and V. P. Chebotayev, "Laser Frequency Standards", Sov. Phys. Usp., 29, 83 (1986); V. P. Chebotayev, V. G. Goldort, A. N. Goncharov, A. E. Ohm and M. N. Skvortsov, "Argon Ion Laser with High Frequency Stability", Metrologia 27, 61 (1990); and J.-M. Chartier et al, "International Comparison of Iodine-Stabilized Lasers at λ=633 nm Involving Seven Laboratories", Metrologia 28, 19 (1991).)

The above-described method, of course, requires that the laser frequency of cavity 12 should closely correspond to the resonant frequency of cavity 14. For this purpose it is desirable to utilize controls to operate the stabilitron so as to keep the two cavities adjusted to the right length. The following method provides a way of achieving this objective.

It should be understood that the three-mirror laser-absorber cavities are supported on a frame made from materials with unusually small thermal expansion coefficients such as cervit or quartz or any of a number of other such materials. The system should, of course, be placed within a temperature-regulated housing—or at least one which is thermally insulated. Even after taking these steps, however, there still could be residual drift of the cavity frequencies due to the effect of small amounts of thermal expansion and contraction in the cavity materials resulting in changes in the lengths of the cavities. Hence, some additional automatic control may be desirable, such as the one which will now be described. In the following description, it has been assumed that the cavities have initially been adjusted to near optimum conditions—in particular, that the laser frequency has been adjusted to coincide with the absorbing cavity frequency.

Perhaps the simplest method to control the effects of thermal expansion and contraction is to monitor the intensities coming out of each end of the laser system. Using the same notation as that applying to FIG. 1, the objective is to vary the length of absorbing cavity 14 so that $P_2$ is a maximum and to vary the length of the gain cavity 12 so that $P_1$ is a minimum. At optimum adjustment, $P_1$ is at a quadratic minimum as a function of the change of the separation between $M_1$ and $M_2$, and $P_2$ is at a quadratic maximum as a function of change of the separation between mirrors $M_2$ and $M_3$. Because the cavity resonances are closely spaced compared to the widths of the absorber and gain profiles, this variation in cavity lengths changes the frequency of the oscillation slightly. But at the optimum settings (because of the quadratic extrema) small variations in cavity lengths due to "dithering" (a deliberate, small modulation of the separate cavity lengths) will produce negligible change in output power.

Figure 4:
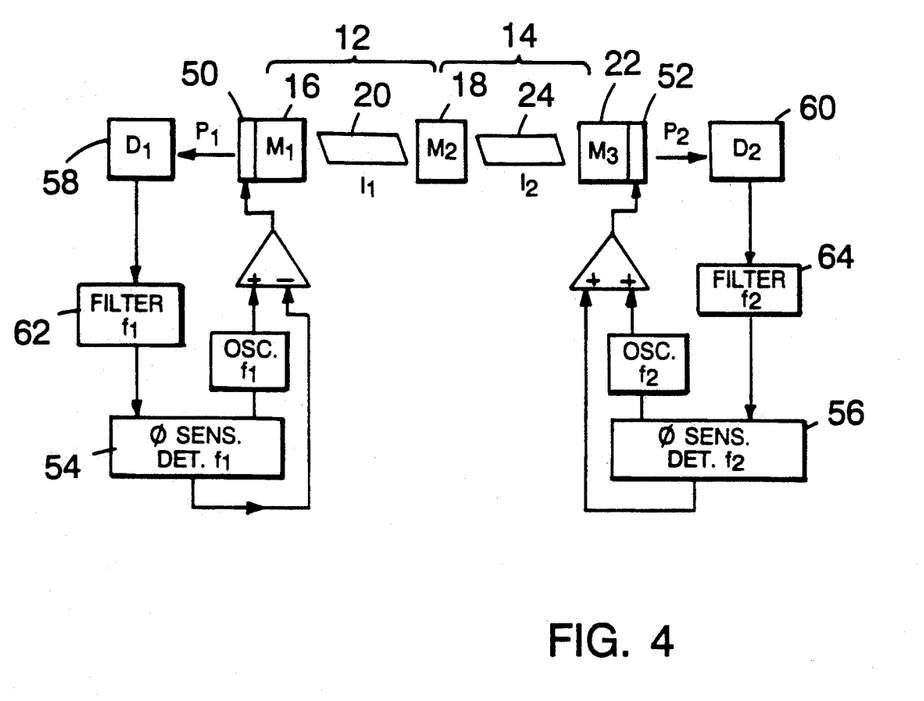
FIG. 4 is a schematic representation of a system to control the length of the two cavities in the laser system.

A negative feedback or servo control can be accomplished automatically by mounting mirrors $M_1$ and $M_3$ (as shown in FIG. 4) on piezoelectric elements 50 and 52, respectively, in accordance with methods that are well-known to experts in the field. Each of these elements 50 and 52 is modulated (or "dithered") a small amount at substantially different, incommensurate frequencies ($f_1$ and $f_2$). The intensity variation at each respective frequency in phase with the modulation (or "dithering") signal is determined with phase-sensitive ("lock-in") detectors 54 and 56 tuned to those frequencies (one using as reference the oscillator voltage at frequency, $f_1$, and the other using as a reference the oscillator voltage at frequency, $f_2$.

Electrical signals proportional to $P_1$ and $P_2$ are obtained from photodetectors $D_1$ 58 and $D_2$ 60 and passed through narrow band transmission filters 62 and 64 centered at the frequencies $f_1$ and $f_2$, respectively, to provide input signals at the modulation frequencies to their respective phase-sensitive detectors 54 and 56. The slowly varying outputs from phase-sensitive detectors 54 and 56 are then used to provide dc error voltages which control the movement of their respective piezoelectric elements. The error voltages are combined with the oscillator voltages so as to turn their respective cavities to the desired extrema. The in-phase error signal for gain cavity 12 is subtracted from the oscillator voltage at frequency $f_1$ to adjust $P_1$ to a minimum, and the in-phase error signal for absorbing cavity 14 is added to the oscillator voltage at frequency $f_2$ so as to adjust $P_2$ to be a maximum. Although the laser frequency will vary somewhat in this method, laser system 10 is kept at the optimum operating conditions to minimize intensity fluctuations in the output beam, $P_1$.

Figure 5:
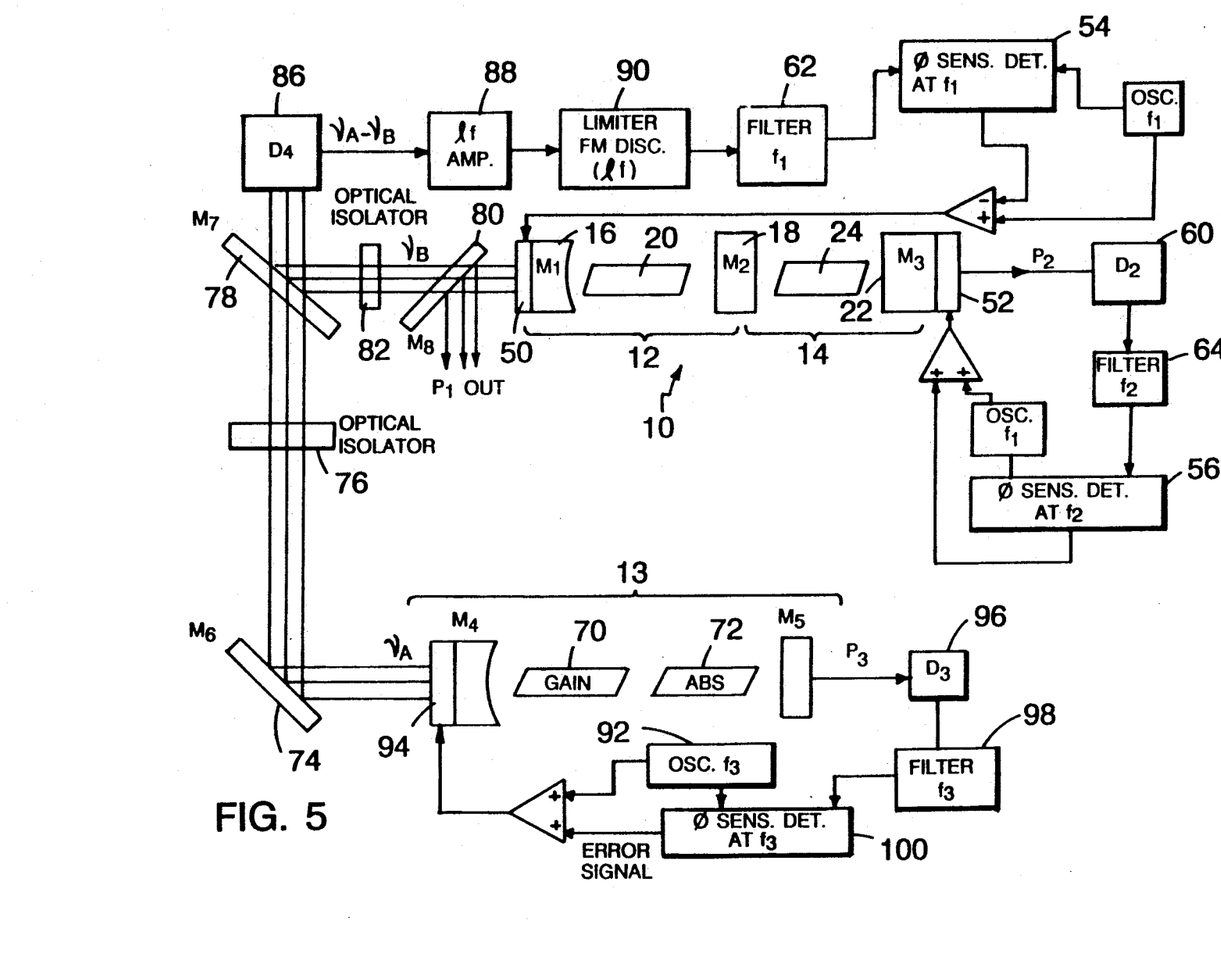
FIG. 5 is a schematic representation of a system which incorporates the control mechanism of FIG. 4 along with a frequency lock stabilization mechanism.

FIG. 5 is an overall schematic diagram of a representative method which also includes a mechanism for locking laser system 10 to a frequency-stabilized laser cavity 13), formed by mirrors $M_4$ and $M_5$, a gain medium 70 and an intra-cavity saturable absorber 72. This method incorporates elements from the earlier described technique illustrated by FIG. 4. Three-mirror cavity laser 10 is shown along with components from FIG. 4, retaining the same notation as was used in FIG. 4. Piezoelectric elements 50 and 52 are incorporated on mirrors $M_1$ and $M_3$.

The oscillator at frequency $f_2$ provides a dither signal to mirror $M_3$ producing a variation in output power $P_2$ in phase with the oscillator at $f_2$. As before, output beam $P_2$ is converted to an electrical signal by photodiode $D_2$ 60. That signal passes through narrow band filter 64 at $f_2$ and becomes the input to phase-sensitive detector at $f_2$ 56. As before the oscillator at $f_2$ also provides a reference signal for phase sensitive detector 56, and the in-phase component from phase sensitive detector 56 provides an error signal which is added to the oscillator voltage going to piezoelectric element 52 on mirror $M_3$. As in the previously described method 1, this circuit adjusts the separation between mirrors $M_2$ and $M_3$ so as to provide a maximum in output power $P_2$ from absorbing cavity 14. This process adjusts the length of cavity 14 so that its resonance matches the resonance of the gain in gain cavity 12.

The main difference between the present technique (i.e., FIG. 5) and the previously described technique (i.e., FIG. 4) is that the frequency of laser system 10 is set to a constant offset from frequency-stabilized laser (i.e., cavity 13) by adjusting the separation of mirrors $M_1$ and $M_2$ in gain cavity 12.

In what follows it will help to emphasize that the frequencies $f_1$, $f_2$ and $f_3$ are different, incommensurate frequencies falling below the rf (radio frequency) range. In contrast, the frequencies $\nu_A$ and $\nu_B$ are in the optical range. $\nu_A$ is the resonant frequency of saturable absorber 72 to which the laser in cavity 13 is locked, and $\nu_B$ is the frequency of laser system 10, which can be determined by adjusting the separation between mirrors $M_1$ and $M_2$. The laser system frequency ($\nu_B$) is deliberately offset from the resonant absorber frequency ($\nu_A$) by a fixed amount in the if or intermediate (radio) frequency range—for example, 10.7 MHz. (The latter value is suggested merely for practical convenience because it is used in many commercially available FM receivers; hence, the narrow band amplifiers, limiters, and FM-discriminators found in these readily available FM tuners can be used to advantage in the present circuit.)

For the moment, assume that $\nu_A$ is an optical frequency precisely tuned to the saturable absorber resonance and comes out of the laser in cavity 13. (The same saturable absorber media are used in both absorber cavity 14 and cavity 13; and the same gain media are used in both gain cavity 12 and cavity 13. The operation of the laser in cavity 13 will be discussed later.) The beam at frequency $\nu_A$ from the laser in cavity 13 going to the left is reflected from high reflectance mirror 74 ($M_6$) at 45 degrees, runs through an optical isolator 76 and through another 45 degree, partially transmitting mirror 78 ($M_7$), by means of which it is combined with a fraction of the laser beam at frequency $\nu_B$ from laser system 10. Most of the power $P_1$ coming from the left end of the stabilitron is coupled out of the system by a reflecting mirror 80 ($M_8$). Some of $P_1$ passes through mirror $M_8$, through an optical isolator 82 and is reflected by mirror $M_7$ into a photodiode 86 ($D_4$).

Photodiode $D_4$ is a device which responds to the square of the total electric field incident on it and as a result produces an output current with a frequency component $= \nu_A - \nu_B$, which represents the difference between the optical frequency of laser system 10 and that of the frequency-stabilized laser. This signal is run through a narrow band if amplifier 88, a limiter and an FM discriminator 90. The output of FM discriminator 90 provides a voltage proportional to the optical difference frequency. That signal then passes through narrow band filter 62 at frequency $f_1$ and to the input of phase sensitive detector 54 at frequency $f_1$. As before, the oscillator voltage at frequency $f_1$ is used as a reference in phase sensitive detector 54 and is also applied to piezoelectric element 52 on which mirror $M_1$ is mounted to provide frequency modulation of the optical frequency for laser system 10. The output of phase sensitive detector at $f_1$ 54 thus provides an error signal which is applied inversely to stabilize the frequency of laser system 10 at a constant offset (e.g., 10.7 MHz) from the optical frequency standard.

Locking one laser to another is a technique familiar to those skilled in the laser field. The above-described method for locking one laser to another has been discussed in more detail by W. R. Bennett, Jr. *The Physics of Gas Lasers*, (from Documents in Modern Physics, edited by E. W. Montroll, G. H. Vineyard, M. Levy, and P. Mathews, Gordon and Breach Science Publishers, New York, 1977); Chapter 2; see discussion of FIGS. 2-29 on p. 164, incorporated herein by reference.]

Both laser system 10 and the frequency-stabilized laser are assumed to have the same linear polarization produced by the Brewster angle windows shown schematically in the figure. The two optical isolators 82 and 76 (one between mirror $M_7$ and $M_8$ and the other between $M_6$ and $M_7$) are introduced to keep these two lasers from interfering with each other. For example, the isolators might consist of quarter wave plates which rotate the plane of polarization 45 degrees in each transmission. Thus the two lasers have polarizations which have each been rotated by 45 degrees (hence, they have the same plane of polarization) when the two beams combine at the photodiode $D_4$. The optical beams reflected back by photodiode $D_4$ into either laser would be rotated in polarization by an additional 45 degrees and hence have orthogonal polarization to the original fields.

Frequency stabilization of the laser in cavity 13 may be accomplished by locking the frequency of that laser to the absorber line center using a method based on hole burning effects. [See more extended discussion in W. R. Bennett, Jr., *The Physics of Gas Lasers*, op. cit., pp. 166-177, incorporated herein by reference.] Cavity 13 is a normal two-mirror cavity which contains both gain medium 70 and a resonant saturable absorber 72. In this case, relatively low pressures are chosen in the absorber cavity so that saturation occurs by burning sharply localized holes in the frequency response curve of the absorber. The width of these holes burned in the absorber profile are roughly equal to the natural width of the absorber transition which in turn is determined by the lifetimes of the upper and lower states on that line. If we deal with ground state absorbers, these widths can be very narrow (in the order of or less than 1 kHz at the optical frequency). Because there is a standing wave in the cavity made up of running waves travelling in opposite directions and because the lines are primarily broadened by the Doppler effect from the atom's or molecules' thermal motion, one gets the sort of structure on a single-mode tuning curve of the type shown in FIG. 6.

Figure 6:
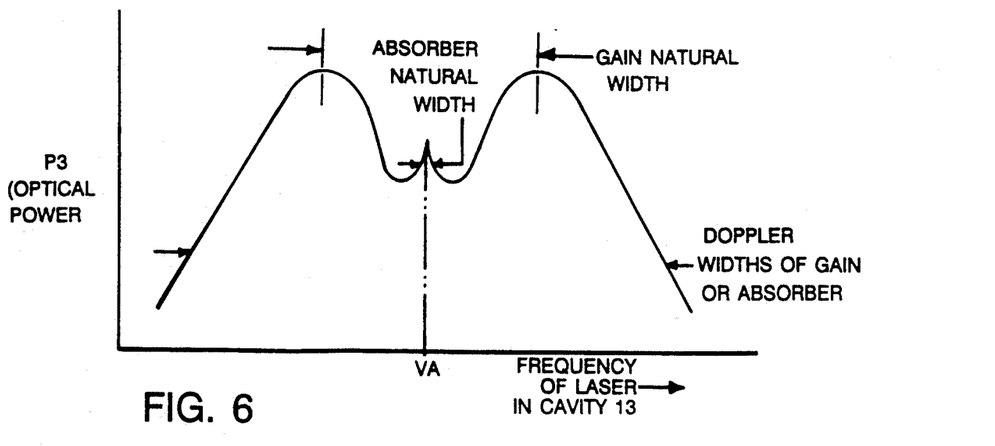
FIG. 6 shows a representative tuning curve for a laser with an intra-cavity absorber.

When the laser frequency differs a lot from the absorber resonance, the running waves interact with molecules that are separated in the velocity distribution and two holes are burnt in the line profile. As the laser frequency is turned towards the center of the absorber resonance, these two holes start to overlap and the two fields are competing for the same molecules in the velocity distribution curve. As a result there is a decrease in absorption, hence an increase in emission, which is sharply localized within the natural width to the absorber resonance. One therefore sees a sharp spike in the output power at $\nu_A$ as the cavity resonance is tuned through the line. With Doppler broadened amplifying media, one also sees a similar dip in the gain and hence in output power at the center of the amplifying transition which has a width roughly equal to the amplifier natural width (usually in the order of 10 or more MHz). Hence, the absorber resonance often exists as a small peak at the middle of a dip at the center of the line.

FIG. 6 has been drawn for the case where the absorber resonance and the amplifier resonance are coincident. However, the absorber might easily be shifted away from the center of the amplifying transition. Because the absorber in many cases involves a ground state, the absorber natural width can be unusually narrow and the absorber density can be kept very low. Hence, pressure shifts are small in the absorber cell and one obtains a very stable frequency reference.

The elements shown at the bottom of FIG. 5 represent one method to stabilize the laser in cavity 13 on the absorber resonance. An oscillator 92 at frequency $f_3$ is used to dither the cavity length by applying a voltage to a piezoelectric element 94 on which mirror $M_4$ is mounted. This produces a shift in the laser frequency in cavity 13 which is in phase with the dither signal. When the resonance of cavity 13 is adjusted so that the laser frequency is at the sharp absorber resonance at $\nu_A$, variations in the output intensity at the dither frequency will go to zero. The output $P_3$ of the laser is fed to a photodiode 96 ($D_3$) which produces an electrical signal at the dither frequency which in turn is fed through a narrow band filter 98 and into a phase sensitive detector 100 at frequency $f_3$. Because phase sensitive detector 100 uses a reference voltage from the oscillator at $f_3$, its output provides an error signal which may be used to adjust laser output to the peak in the laser tuning curve at $\nu_A$. Long-term frequency stabilization has been produced in this manner to within errors of about 1 part in $10^{12}$ as described in some of the aforementioned articles on laser frequency stabilization.

It should be understood that though many of the suggested embodiments primarily envisioned laser stabilization applications at optical frequencies, the invention is not limited to only such applications. For example, the same approach would also work to stabilize microwave masers in microwave cavities.

Other embodiments are within the following claims.

What is claimed is:

1. An intensity stabilized laser comprising:
   a gain cavity containing a gain medium; and
   an absorbing cavity containing a nonlinear absorbing medium, wherein the absorbing cavity is located with respect to the gain cavity and the characteristics of the nonlinear absorbing medium are selected so as to provide negative feedback via reflected energy from the absorbing cavity to the gain cavity during operation of the laser to thereby control the gain of the gain cavity.

2. The intensity stabilized laser of claim 1 wherein the gain cavity and the absorbing cavity each have resonances which substantially coincide so as to produce a strong interaction between the gain cavity and the absorbing cavity during operation of the laser.

3. The intensity stabilized laser of claim 1 wherein the nonlinear absorbing medium is a saturable absorbing medium.

4. The intensity stabilized laser of claim 1 wherein loss for the laser can be characterized by an effective loss ($L_{ef}$) that is a function of a field intensity I in the gain cavity and wherein the effective loss is characterized by a region in which the first and second derivatives of the field intensity with respect to the effective loss are zero at a point on the $L_{ef}(I)$ curve.

5. The intensity stabilized laser of claim 4 wherein the operating point of the laser is selected to be in the vicinity of the point at which the first and second derivatives of the field intensity with respect to the effective loss are zero.

6. The intensity stabilized laser of claim 1 wherein the gain cavity comprises an input mirror and an output mirror.

7. The intensity stabilized laser of claim 6 wherein the absorbing cavity comprises an input mirror and an output mirror.

8. The intensity stabilized laser of claim 7 wherein both the output mirror of the gain cavity and the input mirror of the absorbing cavity are implemented by a single high-reflectance mirror.

9. The intensity stabilized laser of claim 8 wherein the transmission coefficient of the high-reflectance mirror is much less than one.

10. The intensity stabilized laser of claim 9 wherein the transmission coefficient of the high-reflectance mirror is in the range of about $10^{-4}$ to $10^{-3}$.

11. The intensity stabilized laser of claim 1 wherein the gain medium comprises helium-neon gas.

12. The intensity stabilized laser of claim 11 wherein the absorbing medium comprises methane ($CH_4$) and wherein the gain cavity operates to produce electromagnetic radiation having a wavelength of about 3.39 $\mu$m.

13. The intensity stabilized laser of claim 11 wherein the absorbing medium comprises molecular iodine and wherein the gain cavity operates to produce electromagnetic radiation having a wavelength of about 0.633 $\mu$m.

14. The intensity stabilized laser of claim 1 wherein the gain medium comprises helium, carbon dioxide and nitrogen ($He-N_2-CO_2$).

15. The intensity stabilized laser of claim 14 wherein the absorbing medium comprises $SF_6$ and wherein the gain cavity operates to produce electromagnetic radiation having a wavelength of about 10.6 μm.

16. The intensity stabilized laser of claim 1 wherein the gain medium comprises argon ions.

17. The intensity stabilized laser of claim 16 wherein the absorbing medium comprises an iodine molecular absorber and wherein the gain cavity operates to produce electromagnetic radiation having a wavelength of about 0.5145 μm.

18. The intensity stabilized laser of claim 1 wherein the gain medium comprises krypton ions and wherein the absorbing medium comprises iodine saturable absorbers.

19. The intensity stabilized laser of claim 1 wherein the gain cavity and the gain medium forms a exciplex laser and the absorbing medium comprises molecular saturable absorbers.

20. The intensity stabilized laser of claim 1 wherein the gain cavity and the gain medium forms a solid state laser and the absorbing medium comprises a crystal with color centers acting as saturable absorbers.

21. An intensity stabilized laser comprising:
an input mirror;
an output mirror which together with the input mirror forms a first cavity;
an intermediate mirror located between the input and output mirrors to define a gain cavity and an absorbing cavity both within the first cavity, the gain cavity bounded on one end by the input mirror and on its opposite end by the intermediate mirror and the absorbing cavity bounded on one end by the intermediate mirror and on its opposite end by the output mirror;
a gain medium located in the gain cavity; and
a nonlinear absorbing medium located in the absorbing cavity, wherein the characteristics of the nonlinear absorbing medium are selected so as to provide negative feedback via reflected energy from the absorbing cavity to the gain cavity during operation of the laser.

22. The intensity stabilized laser of claim 21 wherein the intermediate mirror is a high-reflectance mirror.

23. The intensity stabilized laser of claim 22 wherein the transmission coefficient of the high-reflectance mirror is much less than one.

24. The intensity stabilized laser of claim 23 wherein the transmission coefficient of the high-reflectance mirror is in the range of about $10^{-4}$ to $10^{-3}$.

25. The intensity stabilized laser of claim 1 wherein the characteristics of the nonlinear absorbing medium are selected so that absorption in the absorbing cavity decreases with increased field intensity in the absorbing cavity.

* * * * *

UNITED STATES PATENT AND TRADEMARK OFFICE
CERTIFICATE OF CORRECTION

PATENT NO.  : 5,251,229

DATED       : October 5, 1993

INVENTOR(S) : William R. Bennett, Jr.; Veniamin P. Chebotayev

It is certified that error appears in the above-identified patent and that said Letters Patent is hereby corrected as shown below:

Col. 6, line 8, delete "$L_{ef}-1-R_{ef}+T=2f$" and insert therefor --$L_{ef}=1-R_{ef}+T=2f$--.

Signed and Sealed this

Fourteenth Day of June, 1994

Attest:

BRUCE LEHMAN

Attesting Officer

Commissioner of Patents and Trademarks